United States Patent [19]

Hara

[11] Patent Number: 5,469,306
[45] Date of Patent: Nov. 21, 1995

[54] DIGITAL SIGNAL REPRODUCING METHOD AND APPARATUS

[75] Inventor: Masaaki Hara, Kanagawa, Japan

[73] Assignee: Sony Corporatin, Tokyo, Japan

[21] Appl. No.: 139,750

[22] Filed: Oct. 22, 1993

[30] Foreign Application Priority Data

Nov. 2, 1992 [JP] Japan .................... 4-317851

[51] Int. Cl.[6] .................................. G11B 5/035
[52] U.S. Cl. ........................................... 360/65
[58] Field of Search .................. 360/33.1, 32, 46, 360/53, 51, 67, 27, 26, 38.1, 45, 65

[56] References Cited

U.S. PATENT DOCUMENTS

| | | | |
|---|---|---|---|
| 4,809,090 | 2/1989 | Suzuki | 360/66 X |
| 4,908,722 | 3/1990 | Sanobe | 360/46 |
| 5,050,002 | 9/1991 | Suzuki et al. | 360/38.1 |
| 5,177,734 | 1/1993 | Cuminiskey et al. | 370/32.1 |
| 5,220,466 | 1/1993 | Coker et al. | 360/46 |
| 5,267,099 | 11/1993 | Fujiwara et al. | 360/41 X |

FOREIGN PATENT DOCUMENTS 0332079  9/1989  European Pat. Off. ............... 360/65

OTHER PUBLICATIONS

Mita et al., "Adaptive equalization techniques for digital video recording systems", SMPTE Journal, Jan. 1988, pp. 3–7.
Patent Abstracts of Japan, vol. 15, No. 480 (P-1284) 5 Dec. 1991, JP-A-03-207 003 (Fujitsu Ltd) 10 Sep. 1991.
Patent Abstracts of Japan, vol. 14, No. 233 (P-1049) 17 May 1990, JP-A-02 058 706 (Fujitsu Ltd) 27 Feb. 1990.
SMPTE Journal vol. 97, No. 1, Jan. 1988, White Plains, N.Y., USA pp. 8–12 Seiichi Mita & Al. 'Adaptive equalization techniques for digital video recording systems'.
IEEE Transactions on Magnetics, vol. MAG–22, No. 1, Jan. 1986, New York, USA pp. 44–46 D. B. Seymour 'Characterization of dropouts with data read–back errors for digital magnetic–tape recorders'.
Patent Abstracts of Japan, vol. 8, No. 65 (P-263) 27 Mar. 1984, JP-A-58 211 312 (Akai Denki KK) 8 Dec. 1983.

Primary Examiner—Donald T. Hajec
Assistant Examiner—Thien Minh Le
Attorney, Agent, or Firm—William S. Frommer; Alvin Sinderbrand

[57] ABSTRACT

A digital signal reproducing apparatus comprising a magnetic head for reading a video signal from a magnetic tape, a rotary transformer, a reproduction amplifier, a reproduction equalizer, a phase-locked loop, a threshold discriminator, and an amplitude detector. The amplitude detector detects a dropout by threshold-discriminating the nonequalized reproduced signal, and the frequency characteristic of the equalizer is changed in response to detection of any dropout so as to compensate for the dropout. The threshold discriminator detects the reproduced digital signal from the equalized reproduced signal in accordance with a clock signal extracted by the phase-locked loop. The apparatus is capable of reproducing an errorless video signal by compensating for any dropout on the magnetic tape. There is also disclosed a digital signal reproducing method which detects the existence of any dropout when the amplitude of the read signal has become smaller than a predetermined value, and changes the characteristic of the equalizer to compensate for the dropout.

15 Claims, 8 Drawing Sheets

DIGITAL SIGNAL REPRODUCING METHOD AND APPARATUS

BACKGROUND OF THE INVENTION

1. Field of the Invention

The present invention relates to a method and an apparatus for reproducing a digital signal, and more particularly to a method and an apparatus capable of detecting, by a bit discriminator in the apparatus, any dropout caused in a reproduced digital signal due to some defects of a recording medium or the like, and changing the characteristic of a reproduction equalizer temporarily to reduce the errors derived from the dropout.

2. Description of the Related Art

In a digital magnetic recording/reproducing apparatus such as a digital video tape recorder (VTR), there is employed a filter known as a reproduction equalizer for obtaining, from the reproduced signal, data equal to the recorded digital data composed of "1" and "0" bits.

Figure 5:
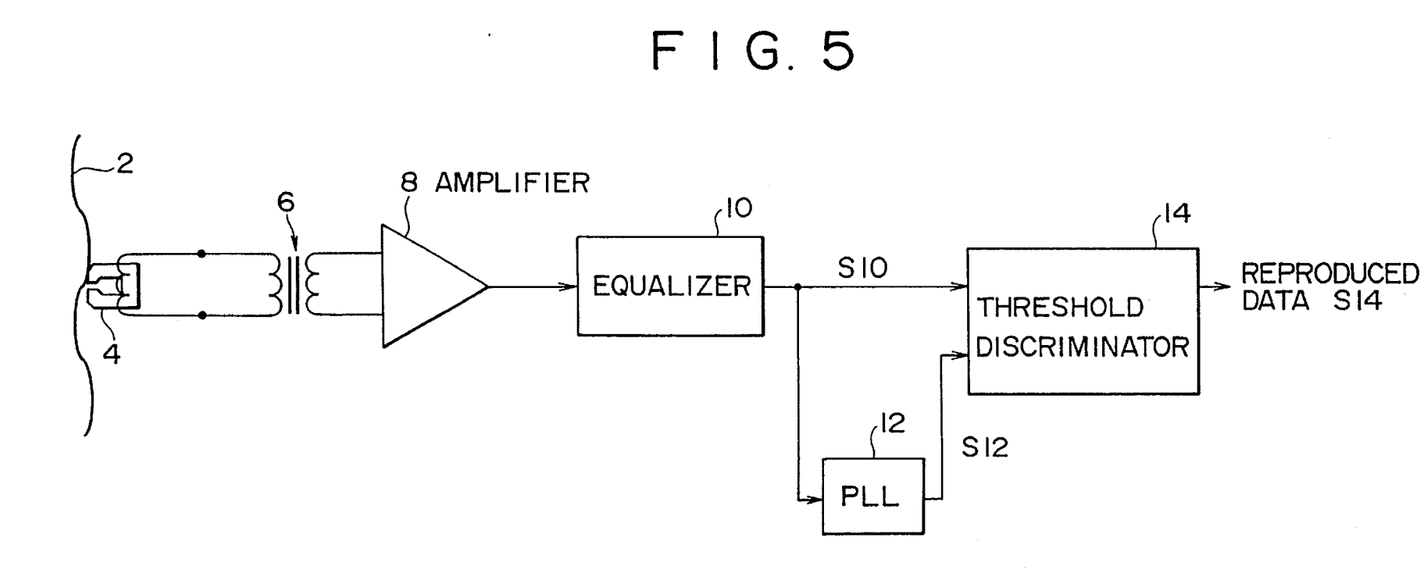
FIG. 5 is a first block diagram of a conventional digital VTR.

FIG. 5 shows an exemplary constitution of a reproducing section in a conventional VTR.

The reproduced signal obtained by reading out the recorded data from a magnetic tape 2 by means of a magnetic head 4 is amplified by a reproduction amplifier 8 after being processed through a rotary transformer 6, and then its waveform is shaped to eliminate the intercode interference by a reproduction equalizer 10. A clock signal S12, synchronized with an equalized signal S10 from the equalizer 10, is extracted by a PLL (phase-locked loop) circuit 12, and an equalized reproduced signal S10 is supplied to a threshold discriminator 14 where the signal S10 is threshold-discriminated by the use of a clock signal S12, so that the original binary digital data is resumed.

The equalizer 10 is so adjusted as to minimize the errors after the discrimination with respect to a normal reproduced signal.

In the magnetic recording medium such as the magnetic tape 2 used here, it is likely that extremely small defects are included in the surface of the magnetic layer. Further, there may occur a disadvantageous occasion that minute dust or the like is deposited on the magnetic tape 2.

Such defects or deposition of dust may cause a phenomenon of dropout that brings about temporary diminution of the amplitude of the reproduced signal.

Since occurrence of any dropout sharply deteriorates the characteristic of the reproduced signal, errors after the discrimination are generated concentratively in the vicinity of the dropout.

Additionally, it is virtually impossible to completely avert such dropout.

Even if complete quality control of the magnetic recording medium is realized in the manufacturing process and no defect is existent to cause dropout at the time of delivery or shipment, it is still impossible to eliminate occurrence of small flaws on the magnetic tape 2 or deposition of minute dust or the like thereon due to, e.g., contact of the magnetic head 4 with the magnetic tape 2.

However, no adequate method has been proposed heretofore for reducing the errors derived from the dropout, nor has any proper means for solving the problem has been devised either.

Figure 6:
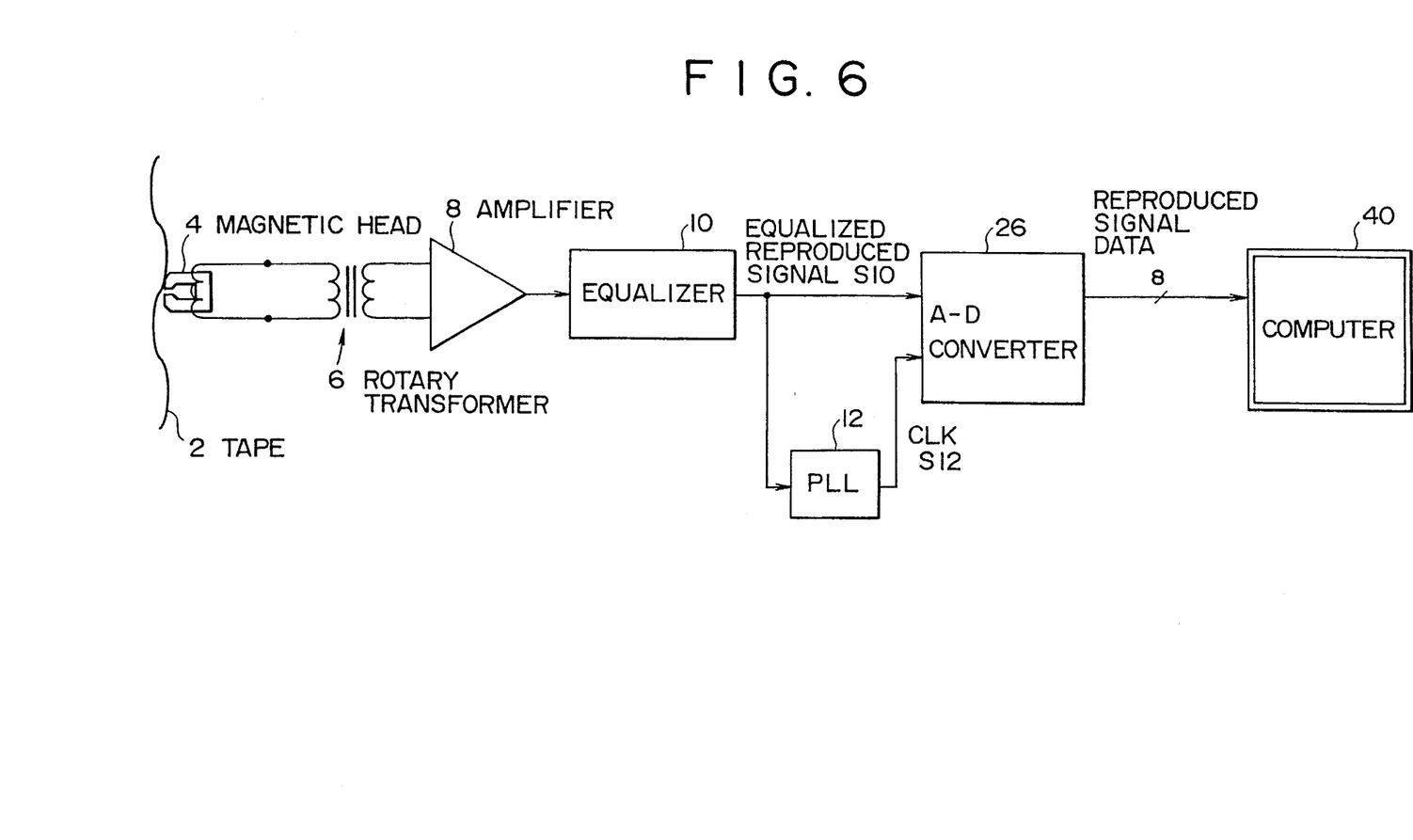
FIG. 6 is a second block diagram of another conventional digital VTR.

Prior to contriving the present invention, an experimental apparatus of the constitution shown in FIG. 6 was produced to evaluate dropouts.

The test evaluation was executed by first equalizing a reproduced signal obtained from a digital of the D2 format, then converting the reproduced signal by an analog-to-digital converter 26 in accordance with a clock signal extracted by a PLL 12, and feeding such reproduced digital signal data into a computer 40.

The successive reproduced signal data was composed approximately of 750 Kbits corresponding to 1 track.

The data obtained by threshold discrimination of the reproduced signal was compared with the recorded data, and it was found that 53 errors were existent to signify an error rate of 7.1E–5 (7×10–5).

According to the result of the detailed inspection, the aforementioned dropouts were included in the reproduced signal data.

Figure 7:
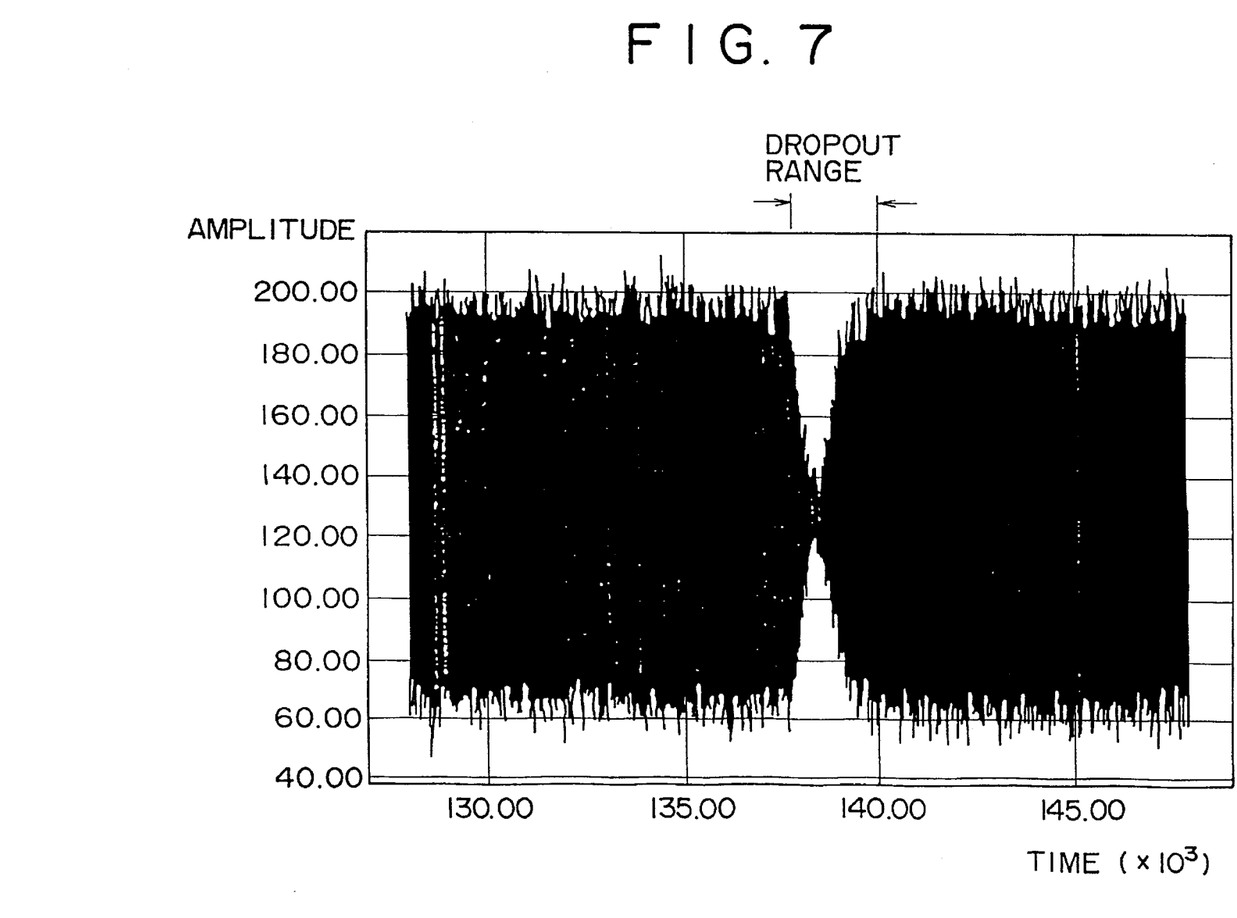
FIG. 7 graphically shows the result of an exemplary experiment executed in the digital VTR of FIG. 6.

FIG. 7 graphically shows the envelope of the reproduced signal with the dropouts existent therein, where the abscissa and the ordinate denote the time and the amplitude respectively.

In this example, it is observed that the amplitude is deteriorated approximately in a range of 2000 bits and is diminished to be nearly zero at the center of the range.

Figure 8:
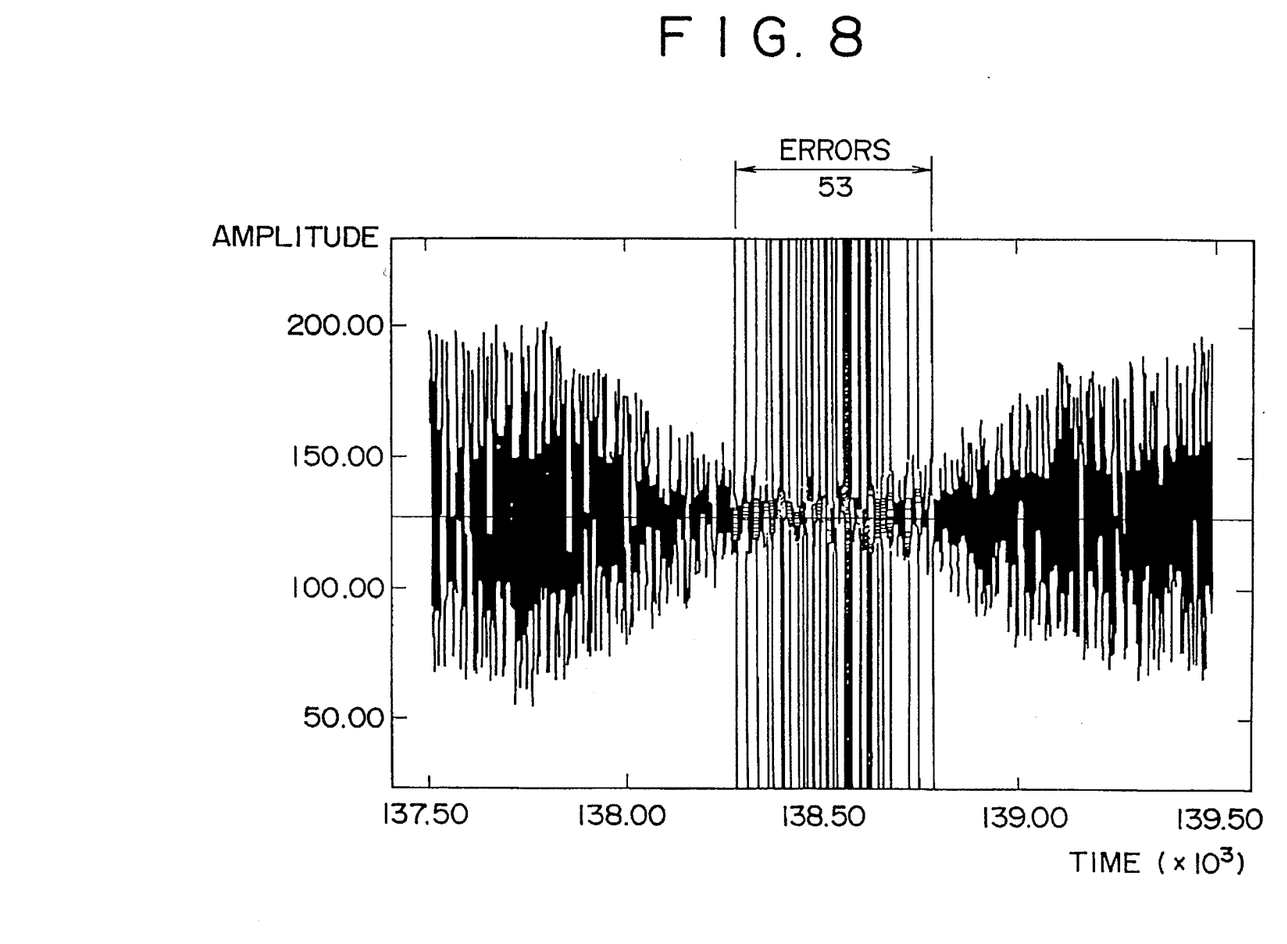
FIG. 8 is an enlarged partial graphic diagram of FIG. 7.

FIG. 8 is an enlarged graphic diagram showing the dropout portions of the reproduced signal shown in FIG. 7, wherein 53 bits recognized as errors after the discrimination are represented by vertical lines.

It was found by examining such error bits that the entire errors were approximately within a range of 500 bits in the vicinity of the center of the dropouts.

It is evident from the above evaluation that, in a digital VTR having a sufficiently high signal-to-noise ratio and equipped with a proper equalizing function, errors derived from dropouts are usually dominant. Therefore, if such errors can be reduced by some appropriate means, the reliability of the system will be widely enhanced and the reference level in quality control of the recording media will be lowered with alleviation of the requisite condition to eventually curtail the production cost of magnetic tape and so forth.

SUMMARY OF THE INVENTION

In view of the circumstances mentioned above, it is an object of the present invention to provide an improvement which is capable of eliminating dropouts to thereby reduce the errors derived from such dropouts.

To perform proper equalization in a digital signal reproducing apparatus such as a digital VTR, there is employed a circuit for monitoring the amplitude of a reproduced signal, a reproduction equalizer capable of changing the equalization characteristic by a control signal, wherein any dropout of the reproduced signal derived from defect of a recording medium is detected, and the characteristic of the equalizer is temporarily changed to thereby reduce errors caused concentratively during the dropout period.

According to one aspect of the present invention, there is provided a digital signal reproducing method which, in reproduction of a digital signal recorded on a recording medium, detects the dropout component of the signal read from the recording medium and changes the equalization characteristic.

According to another aspect of the present invention, there is provided a digital signal reproducing apparatus which comprises means for reading a digital signal recorded on a recording medium; means for equalizing the read signal; means for detecting the amplitude of the nonequalized or equalized read signal and changing the characteristic of the equalizing means on the basis of the signal representing the detected amplitude; means for extracting a clock signal from the equalized signal; and means for threshold-discriminating the equalized signal in accordance with the extracted clock signal.

In the apparatus of the present invention, a simplified circuit configuration is capable of detecting any dropout and then compensating for the detected dropout to thereby reduce the errors derived from the dropout.

Also in the invention, it becomes possible to enhance the reliability of the digital signal reproducing apparatus as a result of the dropout compensation.

Further in the invention where any dropout is compensatable, the requisite condition relative to a recording medium such as a magnetic tape can be alleviated to consequently facilitate quality control of the recording medium with another advantage of curtailing the production cost.

The above and other features and advantages of the present invention will become apparent from the following description which will be given with reference to the illustrative accompanying drawings.

DESCRIPTION OF THE PREFERRED EMBODIMENTS

Figure 1:
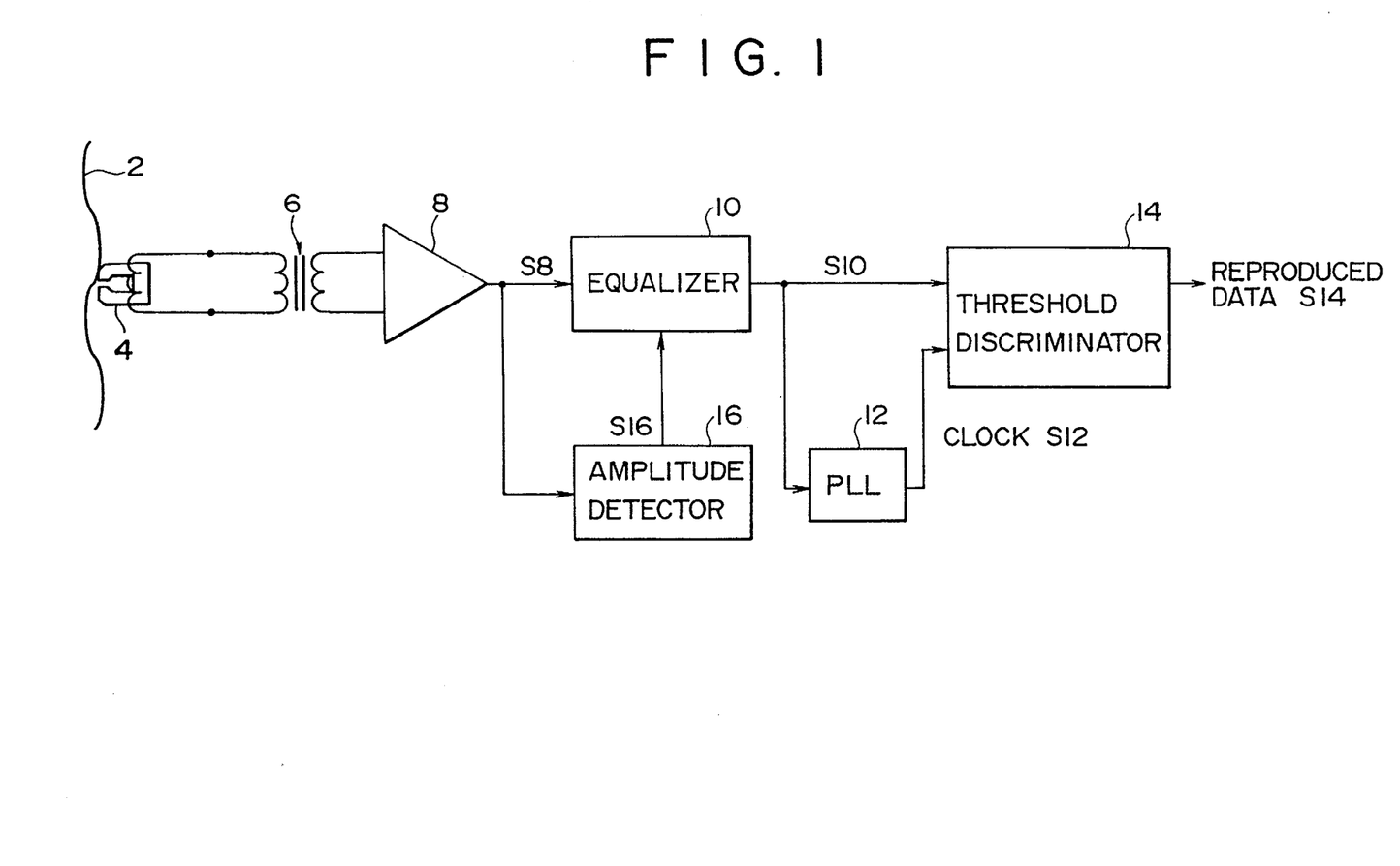
FIG. 1 is a block diagram of fundamental component circuits in a digital signal reproducing apparatus of the present invention.

FIG. 1 is a fundamental block diagram of a digital VTR as a first embodiment representing the digital signal reproducing apparatus of the present invention.

In comparison with the constitution of the aforementioned conventional digital VTR shown in FIG. 5, an amplitude detector 16 is additionally employed in the digital VTR of FIG. 1.

More specifically, the digital VTR shown in FIG. 1 comprises a magnetic head 4 for reading recorded data from a magnetic tape 2, a rotary transformer 6, a reproduction amplifier 8 for amplifying the output signal of the rotary transformer 6 and delivering a nonequalized reproduced signal S8, a reproduction equalizer 10 for equalizing the nonequalized reproduced signal S8, a PLL 12 for extracting a clock signal S12 from the equalized reproduced signal S10 by phase lock; a threshold discriminator 14 for extracting reproduced data S14 by threshold-discriminating the equalized reproduced signal S10 in accordance with the clock signal S12; and an amplitude detector 16 for generating an equalization characteristic control signal S16 by detecting the amplitude of the nonequalized reproduced signal S8 inputted thereto. In the equalizer 10, the nonequalized reproduced signal S8 is equalized on the basis of the equalization characteristic control signal S16.

Thus, in the digital VTR, the characteristic of the equalizer 10 is changed in conformity with the amplitude of the nonequalized reproduced signal S8 by the control signal S16 outputted from the amplitude detector 16.

Although the amplitude detector 16 employed in this circuit constitution is so contrived as to detect the amplitude of the nonequalized reproduced signal S8, there is no difference if the detector 16 is so connected as to detect the amplitude of the equalized reproduced signal S10. Namely, the amplitude detector 16 may detect either the amplitude of the nonequalized reproduced signal S8 or that of the equalized reproduced signal S10.

The embodiment described below represents an exemplary case of detecting the amplitude of the nonequalized reproduced signal S8 for detection of any dropout.

The equalization characteristic control signal S16 outputted from the amplitude detector 16 may be a voltage or current proportional to the amplitude of the reproduced signal S8 (or S10), or may be a voltage or current of a staircase waveform.

The simplest method comprises the procedure of first detecting that the amplitude of the reproduced signal has become smaller than a preset value continuously for a predetermined period of time, then regarding it as a dropout, and outputting a flag indicative of such dropout.

The characteristic of the reproduction equalizer may be continuously changed in accordance with the equalization characteristic control signal S16 along a predetermined curve, or may be selectively switched stepwise.

The simplest method comprises the procedure of switching the reproduction equalizer 10 temporarily to another equalizer of different characteristic in response to a dropout-indicating flag outputted from the amplitude detector 16.

The constitution of the digital VTR shown in FIG. 1 is fairly similar to that of an automatic gain controller (AGC) with respect to the function of controlling the circuit on the basis of detection of the signal amplitude.

However, the object of the AGC is to keep the output signal amplitude constant by controlling the entire gain while maintaining the fixed frequency characteristic.

Meanwhile in the digital VTR of the present invention, there exists a great difference that the frequency characteristic of the equalizer 10 is changed in accordance with the amplitude, and it is not exactly necessary to keep the output signal amplitude constant.

Figure 2:
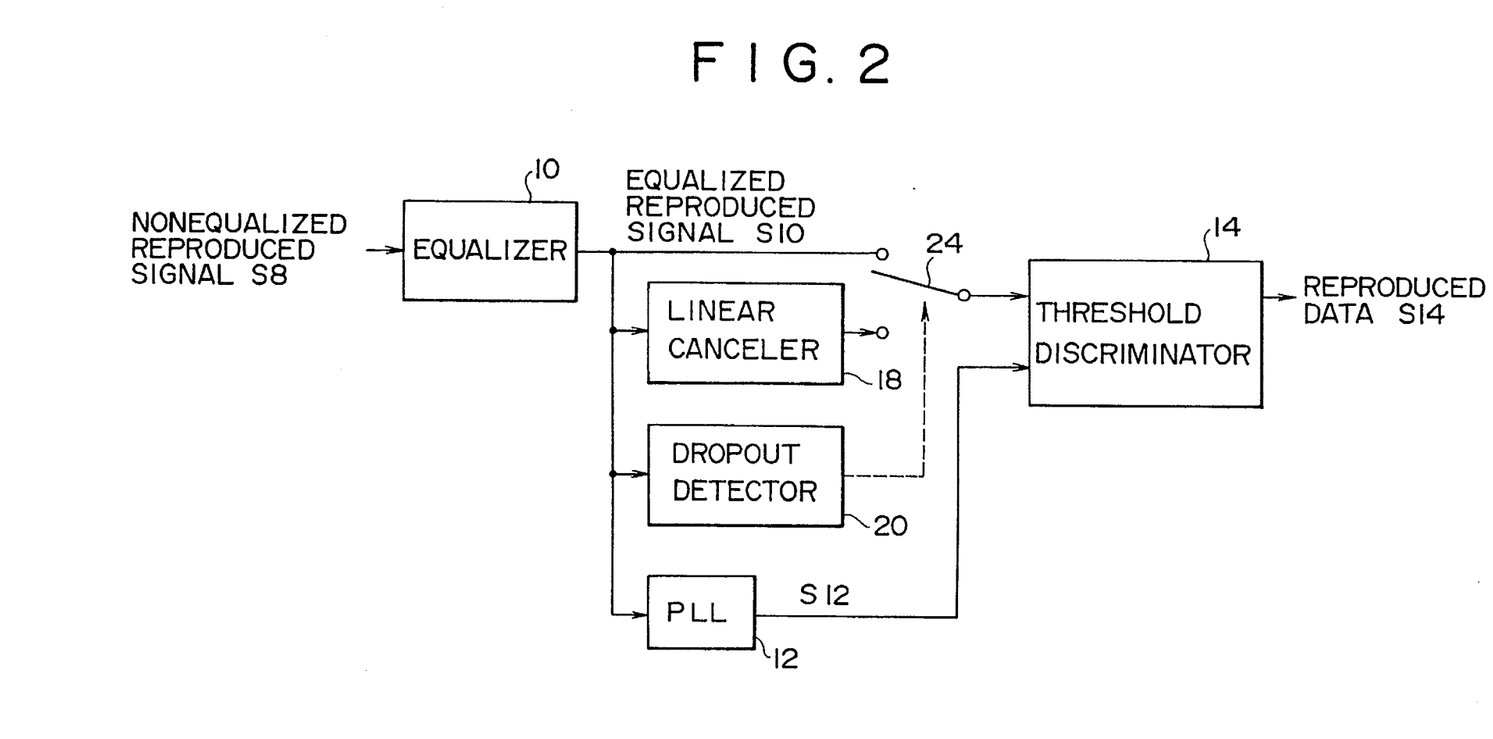
FIG. 2 is a block diagram of a digital VTR as a first embodiment representing the digital signal reproducing apparatus of the invention.

A first embodiment having a circuit constitution of FIG. 2 is contrived by combining the simplest of the fundamental circuits mentioned above.

The digital VTR of FIG. 2 comprises a magnetic head 4, a rotary transformer 6, a reproduction amplifier 8 (all not shown), a reproduction equalizer 10, a PLL 12 and a threshold discriminator 14. In addition, the digital VTR further includes a linear canceler 18, a dropout detector 20 and a switch 24 which are connected in parallel to the PLL 12.

The linear canceler 18 is disposed next to the equalizer 10 in the digital VTR, and the output of the equalizer 10 is supplied directly to threshold discriminator 14 via switch 24 in the absence of any dropout or is supplied to the linear canceler 18 and then to threshold discriminator 14 via switch 24 in the presence of any dropout, whereby errors derived from the dropout are reduced.

If it is supposed that the occurrence of a dropout is caused by an increase in the spacing between the magnetic tape 2 and the magnetic head 4 in the vicinity of the dropout, there will be a consequent deterioration in the higher frequency component of the reproduced signal. However, using the linear canceler 18 is effective, in a simple circuit configuration that eliminates the need for a feed back or feed forward loop, to compensate for the higher frequency component without emphasizing the noise. The linear canceler is similar to an equalizer in that both may compensate for the characteristic deterioration in the vicinity of the dropout. However, the linear canceler differs from an equalizer in that the canceler can compensate for the characteristic deterioration without emphasizing the noise. Further, in this embodiment, the canceler preferably has a characteristic based on a fixed predetermined value.

The dropout detector 20 has a function of selectively changing the switch 24 by detecting that the amplitude of the equalized reproduced signal S10 has become smaller for a predetermined time period than a preset value for a predetermined period of time.

Figure 3:
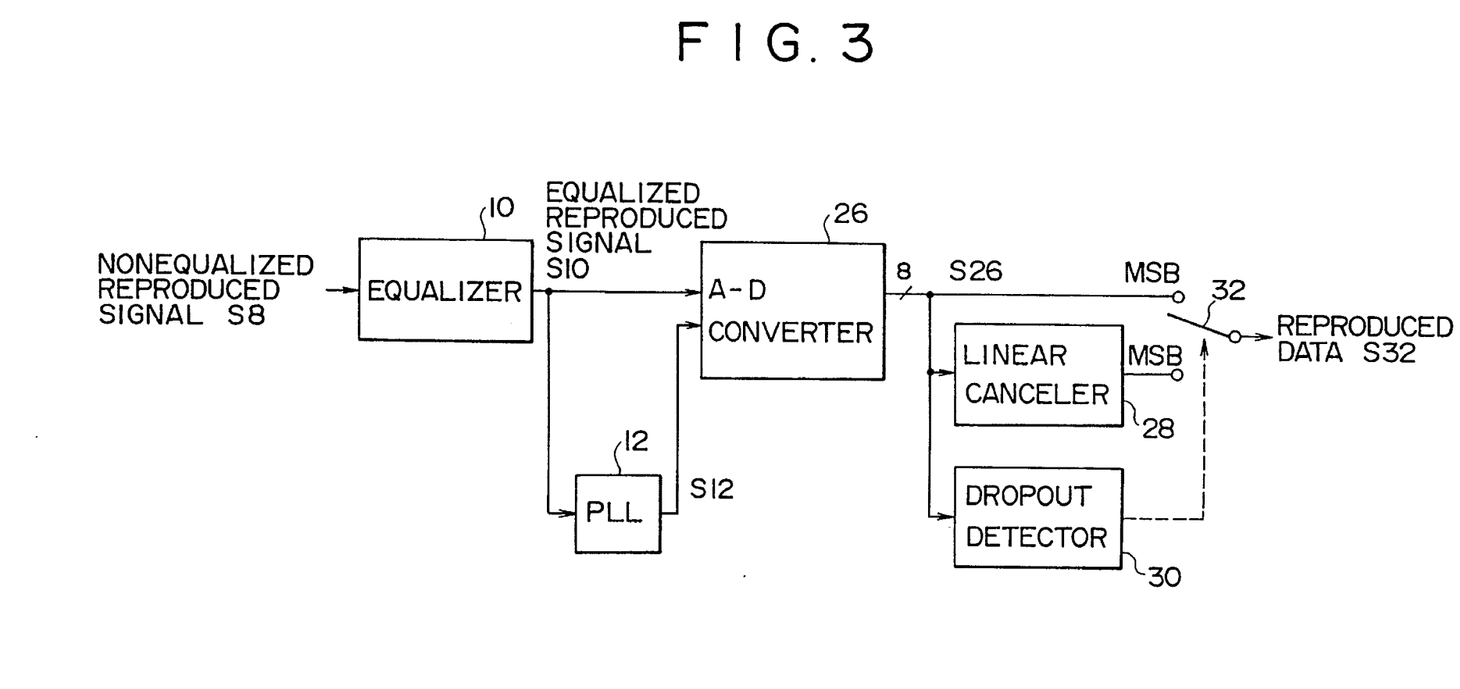
FIG. 3 is a block diagram of a digital VTR as a second embodiment representing the digital signal reproducing apparatus of the invention.

FIG. 3 shows a digital VTR as a second embodiment of the present invention.

This digital VTR comprises a magnetic head 4, a rotary transformer 6, a reproduction amplifier 8 (all not shown), a reproduction equalizer 10, a PLL 12, an AD converter 26, a digital linear canceler 28, a digital dropout detector 30, a switch 32 and a threshold discriminator 14.

The linear canceler 18 can be realized with extreme facility by the use of a digital circuit. Therefore, the circuit configuration is so arranged that the equalized reproduced signal S10 obtained from the equalizer 10 is digitized by the A-D converter 26 in accordance with the sampling clock signal S12 outputted from the PLL 12, and each of the digital linear canceler 28 functionally equivalent to the linear canceler 18 and the digital dropout detector 30 functionally equivalent to the dropout detector 20 is composed of a digital circuit.

In the digital VTR of FIG. 3 employing the dropout detector 30 and the 3-tap linear canceler 28, the following operation is performed with 8-bit analog-to-digital conversion.

Dropout Detector 30

When the amplitude of successive 3-bits is smaller than a preset value, it is detected and regarded as a dropout.

$$(|X[k-1]-T|<DR)\&\&(|X[k]-T|<DR)\&\&(|X[k+1]-T|<DR)$$

where

X[k]: amplitude of kth reproduced signal

T: threshold value

DR: range of amplitude at dropout

Linear Canceler 28

A preset value is added to the reproduced signal in accordance with the result of discriminating the preceding and following bits, and another discrimination is executed.

$$X'[k]=X[k]-2*(A[k+1]-1)*Cn-2*(A[k-1]-1)*Cb$$

$$X'[k]>T-A'[k]=1$$

$$X'[k]<T-A'[k]=0$$

where

A[k]: result of kth discrimination (1 or 0)

Cn: coefficient to following bit

Cb: coefficient to preceding bit

A'[k]: result of kth rediscrimination (1 or 0)

Figure 4:
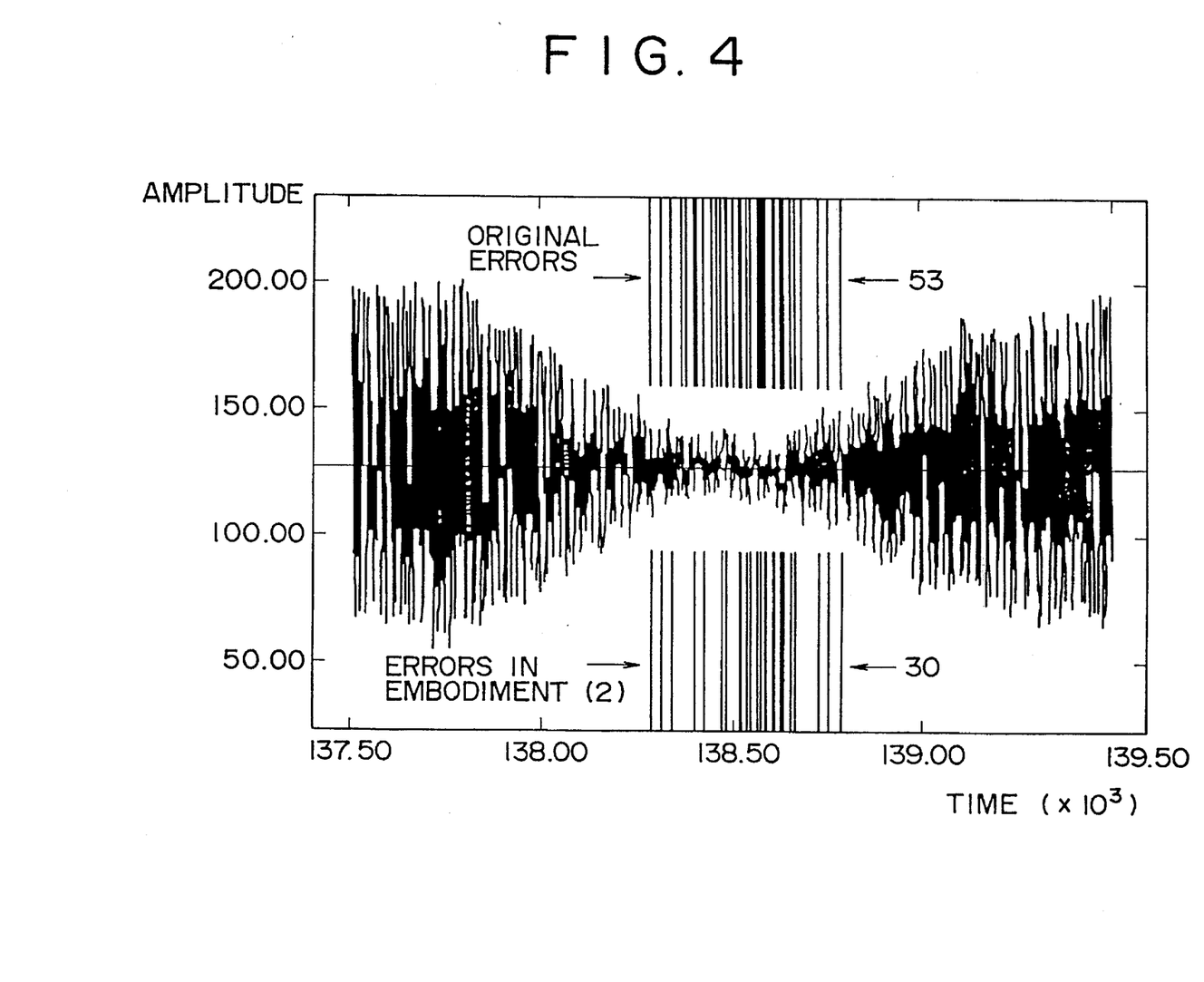
FIG. 4 graphically shows the result of an exemplary experiment executed in the digital VTR of FIG. 3.

FIG. 4 graphically shows the result of verifying the operation in the digital VTR of FIG. 3 by using the data obtained through a computer 40 (not shown) which is disposed next to a threshold discriminator 14 (not shown) in the digital VTR of FIG. 3 as in the aforementioned constitution of FIG. 5.

This experiment was executed under the conditions where the threshold value T was set to 127 which is the middle of values 0 and 255 obtained by the 8-bit analog-to-digital conversion, and Cb=−3.5, Cn= −0.5, and DR=32. In this case, 53 errors derived originally from the dropout were reduced to 30 errors.

Vertical lines in the upper half of the diagram denote positions of the errors generated originally, and vertical lines in the lower half denote positions of the errors generated in the second embodiment.

Although it is impossible as shown to eliminate the errors in the range corresponding to the center portion of the dropout where the amplitude is nearly zero, some errors in the vicinities of the beginning and the end of the dropout where the amplitude still remains partially can be reduced to a certain extent by changing the characteristic of the equalizer.

The embodiments mentioned above represent examples of using a magnetic tape 2 as a recording medium. However, it is to be understood that in the digital signal reproducing apparatus of the present invention, the recording medium is not limited to such magnetic tape alone, and any other recording medium such as a magnetic disk is applicable as well.

Furthermore, although a video signal is recorded as an exemplary digital signal on the recording medium in the description, the apparatus of the invention is usable for reproduction of any other digital signal in addition to the video signal mentioned.

The invention may be embodies in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embranced therein.

What is claimed is:

1. A method of reproducing a digital signal recorded on a recording medium, comprising the steps of:

supplying the reproduced signal to a first signal compensating device having an equalization characteristic, and outputting a corresponding equalized signal;

detecting a dropout component in the equalized signal;

selectively supplying said equalized signal through a second signal compensating device having a fixed characteristic if said dropout component is detected; and selecting the equalized signal output by said first signal compensating device when said dropout component is absent or the equalized signal supplied through said second signal compensation device when said dropout component is detected, thereby compensating for the detected dropout component.

2. The digital signal reproducing method according to claim 1, wherein said step of detecting is performed such that said dropout component is detected when the amplitude of said reproduced signal is smaller than a predetermined threshold value.

3. The digital signal reproducing method according to claim 2, wherein said equalization characteristic is adjusted by selectively changing the frequency characteristic of said first signal compensating device in accordance with said amplitude of said reproduced signal.

4. A digital signal reproducing apparatus comprising:
    means for reproducing a digital signal recorded on a recording medium;
    first signal compensating means, responsive to said reproduced signal, having an equalization characteristic for outputting a corresponding equalized signal;
    means for detecting a dropout component in the equalized signal;
    second signal compensating means, selectively responsive to said equalized signal, having a fixed characteristic for outputting a corresponding compensated signal; and
    means responsive to said means for detecting for selecting the equalized signal output by said first signal compensating means when said dropout component is absent or the equalized signal supplied through said first and second signal compensating means, respectively, when said dropout component is detected to thereby compensate for the detected dropout component.

5. The digital signal reproducing apparatus according to claim 4, further comprising means for extracting a clock signal from said equalized signal, and means for threshold-discriminating one of said equalized signal or said compensated signal in accordance with the extracted clock signal.

6. The digital signal reproducing apparatus according to claim 5, wherein said second signal compensating means comprises a linear canceler for selectively receiving said equalized signal when said dropout component in said equalized signal is detected.

7. The digital signal reproducing apparatus according to claim 6, wherein said means for detecting includes a dropout detector for detecting said dropout component.

8. The digital signal reproducing apparatus according to claim 7, wherein said means for selecting comprises switching means coupled to said dropout detector for selectively switching between receiving said equalized signal and said compensated signal in response to said dropout detector.

9. The digital signal reproducing apparatus according to claim 8, wherein said switching means receives said equalized signal in the absence of said detected dropout component and receives said compensated signal in the presence of said detected dropout component.

10. The digital signal reproducing apparatus according to claim 9, further having an A-D converter coupled to said first signal compensating means for digitizing said equalized signal, and wherein said dropout detector detects said corresponding dropout component in said digitized equalized signal.

11. The digital signal reproducing apparatus according to claim 9, wherein said means for threshold discriminating is coupled to said switching means for receiving the selected one of said equalized signal or said compensated signal.

12. The digital signal reproducing apparatus according to claim 4, wherein said means for detecting the dropout detects a dropout component when the amplitude of said reproduced signal is smaller than a predetermined threshold value.

13. The digital signal reproducing apparatus according to claim 12, further comprising means for adjusting said equalization characteristic by selectively adjusting the frequency characteristic of said first signal compensating means in accordance with said amplitude of said reproduced signal.

14. The digital signal reproducing apparatus according to claim 5, wherein said means for extracting the clock signal includes a phase-locked loop circuit.

15. The digital signal reproducing apparatus according to claim 14, wherein said means for reproducing the video signal recorded on the recording medium includes a magnetic head.

* * * * *